United States Patent [19]

Romano, Jr.

[11] Patent Number: 4,532,380

[45] Date of Patent: Jul. 30, 1985

[54] TONE SIGNALLING ADAPTER FOR A TELEPHONE SET

[75] Inventor: Salvatore A. Romano, Jr., Staten Island, N.Y.

[73] Assignee: The United States of America as represented by the Secretary of the Army, Washington, D.C.

[21] Appl. No.: 608,824

[22] Filed: May 10, 1984

[51] Int. Cl.³ .............................................. H04M 1/30
[52] U.S. Cl. .................................. 179/2 C; 179/92 K
[58] Field of Search ................. 179/2 C, 90 R, 90 A, 179/90 AD, 90 AT, 90 K, 84 VF

[56] References Cited

U.S. PATENT DOCUMENTS 2,272,089  2/1942  La Guardia .................... 179/90 AD
2,889,413  6/1959  Steele ............................ 179/90 AD Primary Examiner—Gene Z. Rubinson
Assistant Examiner—W. J. Brady Attorney, Agent, or Firm—Anthony T. Lane; Jeremiah G. Murray; Edward Goldberg

[57] ABSTRACT

A tone signalling adapter for providing standard dual tone dialing capability to a ring-down type military field telephone set and comprising a 16 button key set mounted on a generally rectangular body secured to a saddle member which clips onto the top portion of the telephone set so that it fits beneath the cradled handset of the telephone, thus enabling the entire assembly to be carried within the confines of an existing carrying case without obstruction. The pushbutton key set, moreover, connects into the field telephone via a preexisting headset-microphone connector on the base of the telephone. The adapter also includes a releasably hinged cover on the side of the saddle member so that it may selectively face forward or backward, for inhibiting use, at certain times, of a hand-crank located on the side of the telephone set.

18 Claims, 7 Drawing Figures

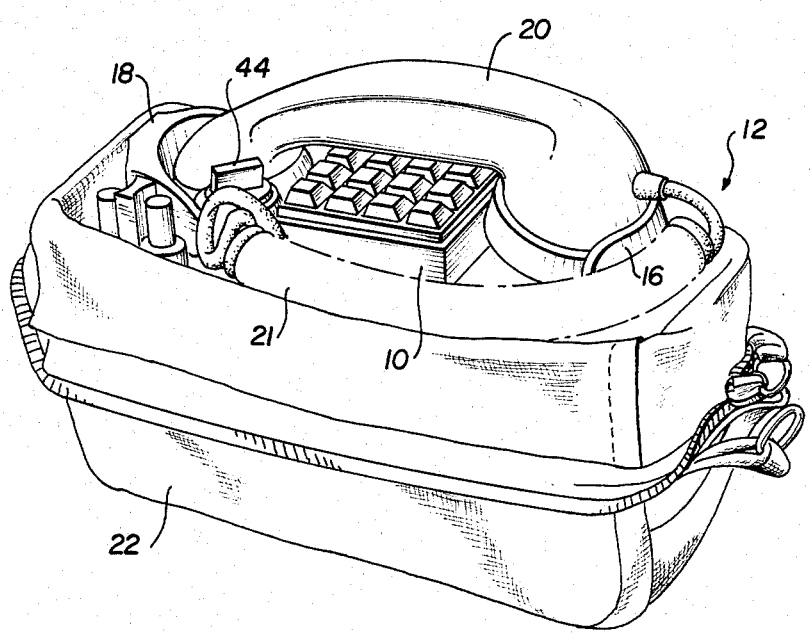
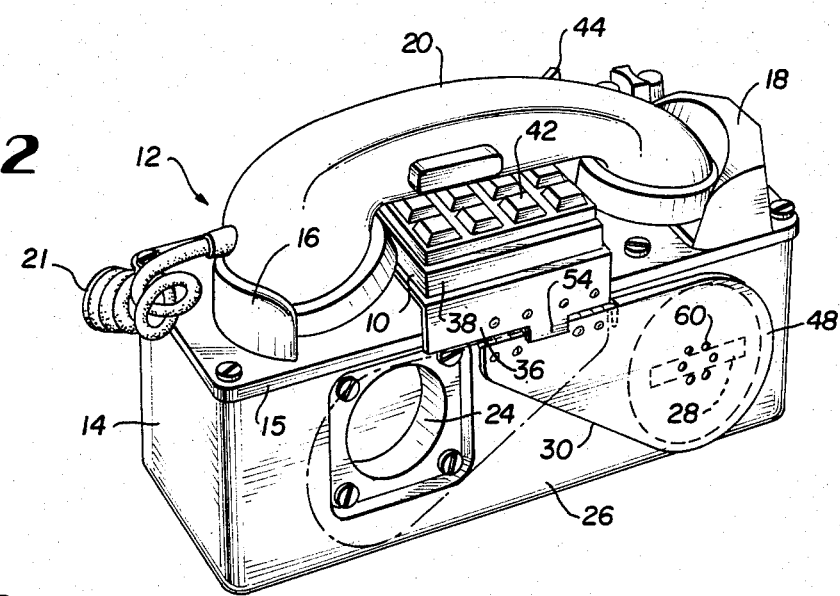
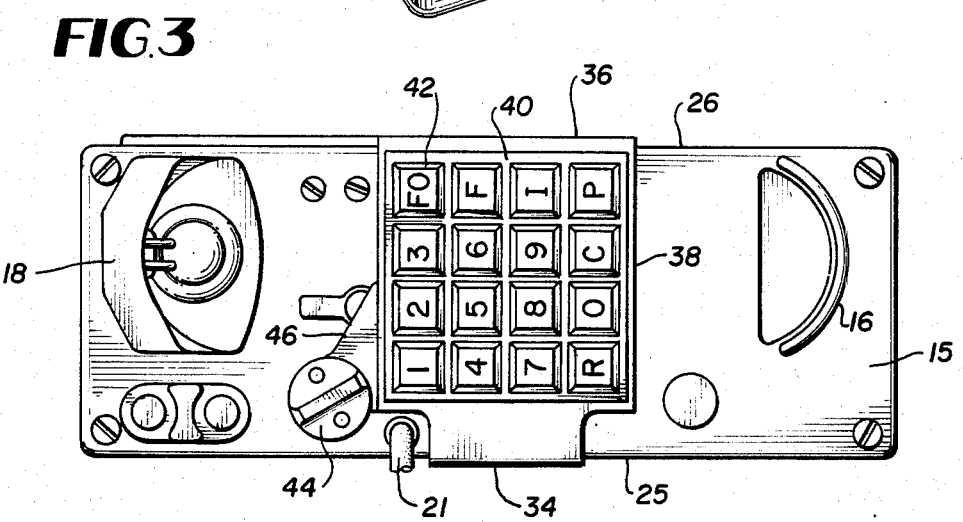

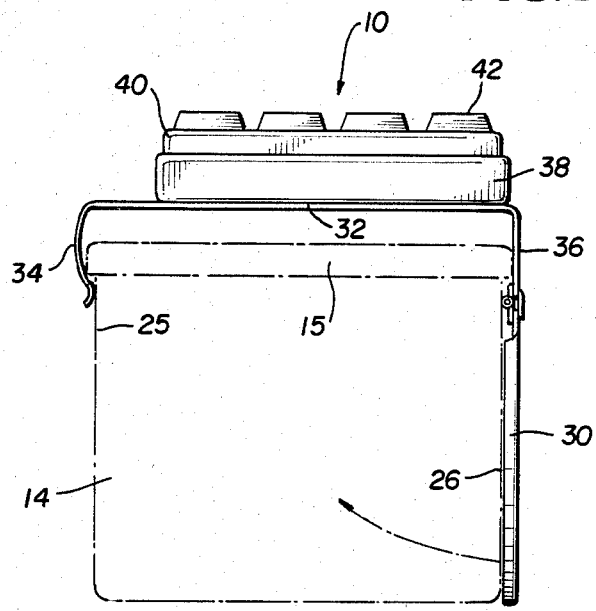
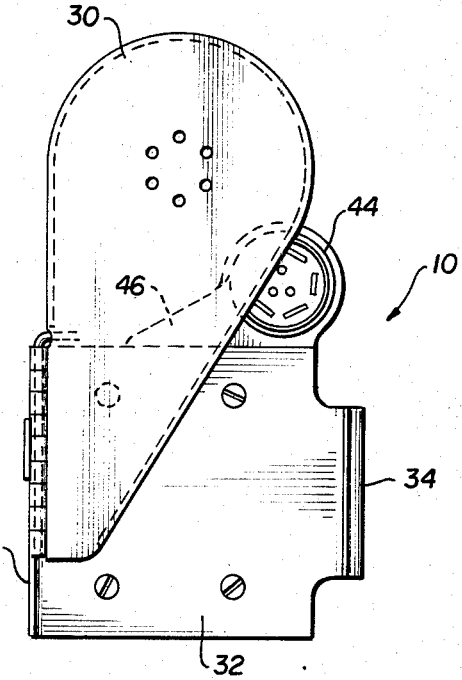
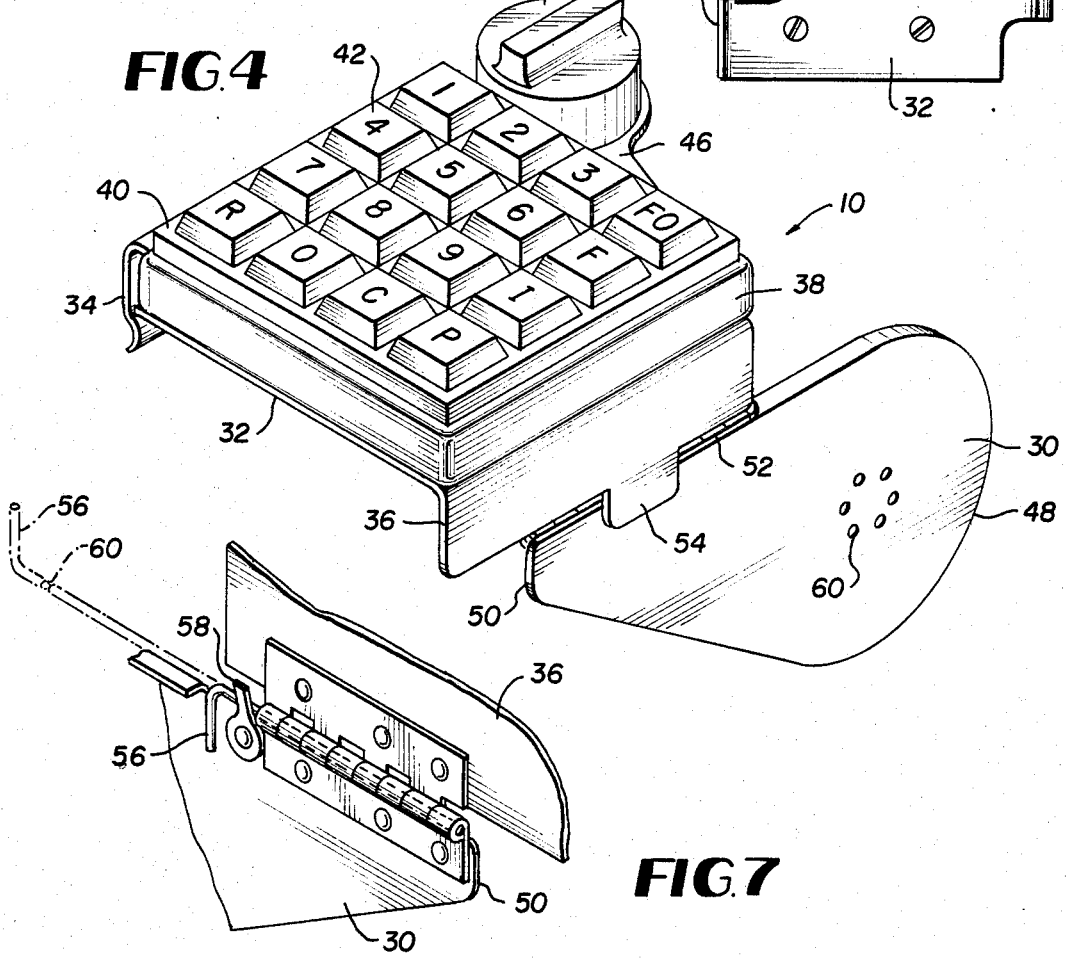

TONE SIGNALLING ADAPTER FOR A TELEPHONE SET

The invention described herein may be manufactured and used by or for the Government for governmental purposes without the payment of any royalties thereon or therefor.

FIELD OF THE INVENTION

This invention relates generally to telephone apparatus and more particularly to a means for adding a pushbutton dialing capability to a ring-down type telephone set.

BACKGROUND

In portable military type field telephones, an example of which comprises the TA-312/PT telephone set, such apparatus is typically comprised of a rugged two-wire telephone set having a hand-crank located on the base which is manually activated to generate a ring-down signal when a telephone call is initiated. Such apparatus as presently constructed does not include either a rotary dialer or a dual-tone pushbutton dialer and thus does not have the ability of being used with automatic telephone central offices, either commercial or military.

It is an object of the present invention, therefore, to adapt a ring-down type telephone set to include a dialing capability.

It is a further object of the invention to provide a ring-down type of telephone set with a tone dialing capability.

It is still a further object of the invention to provide a ring-down type of telephone with a pushbutton tone dialing capability.

And yet another object of the invention is to convert a conventional military type telephone to a telephone set having a standard pushbutton tone signalling capability for operating with automatic central offices.

And still another object of the invention is to adapt a portable two-wire military type field telephone with a pushbutton tone signalling capability without exceeding the space requirements specified for use with an existing carrying case.

SUMMARY

The foregoing as well as other objects of the invention are provided by a tone signalling adapter including a main body attached to a saddle member which clips securely to the base of a ring-down type telephone set while fitting entirely under a cradled handset of the telephone. The main body of the adapter further includes protective grid structure which surrounds a keyset module comprised of a 16 button 4×4 keyset, encapsulated electronic tone generating circuitry coupled to an electrical connector, and a battery compartment. The saddle member serves as a mounting plate to receive the adapter to the telephone and includes a removable hinged cover. The removable hinged cover is attached to a side flange on the saddle member and extends downwardly along the side of the base of the telephone for selectively inhibiting the use of a ring generator hand-crank to prevent damage to input electronics of an automatic switchboard located in a central office, for example, by erroneous generation of a ring-down signal. When desirable, however the cover is adapted to be turned around in the opposite direction for use of the telephone in a special application where a ringing capability is needed. The electrical connector provides a means for interconnecting to the base of the telephone by means of an existing headset-microphone connector on the telephone and interlocking therewith by means of a manually operated thumbscrew cap which is part of the connector of the adapter. The tone signalling telephone adapter of the subject invention requires no modification of the telephone set and when in place thereon fits entirely within the confines of an existing carrying case for the telephone set.

BRIEF DESCRIPTION OF THE DRAWINGS

While the present invention is defined in the claims annexed to and forming a part of this specification, a better understanding can be had by reference to the following description taken in conjunction with the accompanying drawings in which:

FIG. 1 is a perspective view of the preferred embodiment of the invention in place on a portable telephone set located in a canvas carrying case;

FIG. 2 is a perspective view of the preferred embodiment of the subject invention in place on a portable telephone set exclusive of the carrying case;

FIG. 3 is a top planar view of the invention in place on a portable telephone shown in FIG. 2 with the handset removed;

FIG. 4 is a perspective view generally illustrative of the preferred embodiment of the invention apart from the telephone set;

FIG. 5 is an end planar view of the preferred embodiment of the invention shown in FIG. 4;

FIG. 6 is a bottom planar view of the preferred embodiment of the invention with the side cover retracted thereunder; and FIG. 7 is a perspective view generally illustrative of the spring loaded hinge pin for the cover member of the invention.

DESCRIPTION OF THE PREFERRED EMBODIMENT

Referring now to the drawings and first to FIGS. 1 and 2, reference numeral 10 generally designates a tone signalling adapter for a portable telephone set 12 originally designed to have a "ring-down" capability for use with telephone systems other than automatic switching systems and more particularly is illustrative of a two-wire military type field telephone such as a TA-312/PT telephone set. Such a telephone set as shown is comprised of an elongated rectangular body or base 14 having a removable flat top cover panel 15 with opposing cradle members 16 and 18 being located at either end thereof for holding a handset 20 in place when not in use. The handset 20 connects into the base 14 by means of a length of coiled telephone cord 21. Further, as shown in FIG. 1, the telephone instrument 12 fits within a carrying case 22 which is comprised of flexible material, such as canvas, and is specifically designed for that particular piece of apparatus. The telephone set 12 additionally includes a sounder element 24 in one side 26 of the base 14 as shown in FIG. 2 as well as a handcrank 28 for an internally located ring generator, not shown, which is adapted to be hidden by a removable hinged cover element 30.

As initially supplied, a TA-312/PT field telephone set provides only a ring-down signalling capability, and is therefore incapable of being used with automatic switching systems. The adapter assembly 10, however, is operable to provide pushbutton dual-tone signal dialing without modification of the existing telephone set so that it is selectively able to tone dial into automatic telephone central offices, both commercial and military. Moreover, the adapter 10 is designed to fit within the confines of the telephone set 12 by being positioned over the top cover panel 15 where it clips to the sides 25 and 26 (FIG. 3) of the base 14 intermediate cradle members 16 and 18 and fits entirely under a cradled handset as shown in FIGS. 1 and 2, thus permitting both the adapter and the telephone set to be carried within the existing carrying case 22.

The tone signalling adapter 10 is further shown in FIGS. 4 through 7 and is comprised of a spring steel saddle member 32, as best illustrated in FIG. 4, which is designed to straddle the top of the cover panel 15 and includes a pair of vertically depending side flanges 34 and 36 with the former being bent to form a spring clip at the lower end thereof. In addition to the saddle member 32, a generally rectangular main body 38 includes an upper metal grid structure 40 which is adapted to protect a 16 button 4×4 keyset module 42, further including encapsulated electronic circuitry and a battery compartment, not shown, which is operable to generate the standard, dual-tone dialing signals utilized in conventional tone dialing telephone systems. The battery is accessed by removing the keyset module 42 from the main body 38. The dialing signals, generated by selective activation of the keys of the key set 40, are coupled into the telephone instrument 12 by means of a connector 44 including a twist lock cap which is located on an extension element 46 and which interconnects with the existing headset-microphone connector of the telephone, not shown, located on the top cover plate 15 of the telephone body 14.

When the adapter 10 is in place on the top cover plate 15, the connector element 44 is manually rotated to properly interlock with the headset-microphone connector, not shown, of the TA-312/PT telephone and thus the unit becomes operable to tone dial into an automatic telephone switching system. When used as a tone dialer for use with automatic central offices, it becomes essential to deactivate the generation of any 90VRMS, 20 Hz ring-down signals which would otherwise cause damage to the input circuitry of automatic switchboards. This is provided for in the present invention by the inclusion of the hinged cover 30. This cover as shown in FIG. 5, for example, includes a large rounded end portion 48 and a relatively smaller tapered end portion 50 which is adjacent a hinge 52 which joins the cover 30 to the flange 36 of the saddle member 32. Further as shown in FIG. 4, the flange 36 additionally includes a downwardly projecting tab 54 which functions as a stop to prevent the swinging of the cover 30 outwardly from the side 26 of the telephone body 14 when in place. However, it can fold underneath the saddle member 32 for storage when not in use as shown in FIGS. 5 and 6.

The primary purpose of the hinged cover 30 is to inhibit use of the hand-crank 28 as shown in FIG. 2. However, the cover 30 is made reversible should a special application requiring a ring-down operation exist, in which case it becomes necessary for the cover to project in a rearward direction as opposed to the forward direction as illustrated. Such a use would be, for example, in a "Long-Local Radio Loop" with a SB-3614/T Switchboard where ring signalling is necessary. The reversability is provided by a releasable spring loaded hinge pin 56 which is captured in the cover half of the hinge by an internal spring element 58 as shown in FIG. 7 contacting a groove 60 in the pin near the shank. A safety is thus provided since the pin can be released only when the adapter 10 is off the phone body 14. When the cover 30 is connected so that it faces backwards, the rounded end portion 48 will cover the sounder 24 as shown by the dashed lines in FIG. 2. In order that the sounder output will not be muffled in such an instance, the rounded end portion 48 of the cover 46 includes a plurality of holes 60 arranged in a circle.

Thus what has been shown and described is a tone signalling adapter for a portable military type telephone which adds the standard 16 digit pushbutton dual tone dialing capability to a telephone set which was originally designed for ring-down signalling. Moreover, the 16 button key module is protected from damage by a metal grid structure which fits under the cradled hand set of the telephone so that the original space requirements for being carried in a carrying case are not exceeded, nor does the telephone need to be modified in any way.

Having thus shown and described what is at present considered to be the preferred embodiment of the invention, it should be noted that the foregoing detailed description has been made by way of illustration and not limitation and accordingly all alterations, changes and modifications coming within the spirit and scope of the invention are herein meant to be included.

I claim:

1. A telephone dialing adapter for a ring-down telephone set, comprising, dialing apparatus mechanically and electrically attachable to said telephone set and including means for coupling dialing signals into said telephone set; and means integral with said dialing apparatus for selectively preventing the generation of ring signals when attached to said telephone set.

2. A telephone dialing adapter as defined by claim 1 wherein said telephone set includes a handset and a base adapted to cradle the handset and wherein said dialing apparatus is attachable to said base.

3. A telephone dialing adapter as defined by claim 2 wherein said base includes cradle means and wherein said dialing apparatus is attachable to the base adjacent said cradle means and being located under the handset when said handset is in a cradled position on said base.

4. A telephone dialing adapter as defined by claim 3 wherein said telephone set includes an externally accessible hand-crank utilized for generating a ring-down signal and wherein said means for selectively preventing the generation of said ring-down signals comprises means for inhibiting the usage of said hand-crank by an operator.

5. A telephone dialing adapter as defined by claim 4 wherein said means for preventing the usage of said hand-crank comprises means for covering said hand-crank.

6. A telephone dialing adapter as defined by claim 5 wherein said dialing apparatus comprises tone signalling dialing apparatus.

7. A telephone dialing adapter as defined by claim 6 wherein said tone signalling dialing apparatus includes a key set and battery powered electronic circuitry for generating standard dialing signals.

8. A telephone dialing adapter as defined by claim 6 wherein said dialing apparatus comprises a pushbutton key set module operable to produce standard dual tone signals to thereby provide a capability to tone dial into automatic telephone switching systems.

9. A telephone dialing adapter as defined by claim 8 wherein said key set module comprises a standard 4×4 pushbutton key set providing standard dual-tone signals.

10. A telephone dialing adapter as defined by claim 8 wherein said dialing apparatus further includes means for supporting said key set module and being attached to the base of said telephone set.

11. A telephone dialing adapter as defined by claim 10 wherein said saddle member includes frame means for protecting said key set module.

12. A telephone dialing adapter as defined by claim 2 wherein dialing apparatus comprises a tone dialing key set module and said telephone base comprises an elongated body having a generally flat top plate panel including a pair of opposing cradle members mounted thereon and wherein said dialing apparatus additionally comprises a saddle member adapted to be positioned transversely across the top surface of said top panel intermediate said cradle members.

13. A telephone dialing adapter as defined by claim 12 wherein said saddle member includes a pair of angulated flange members one of which at least forms a spring clip member for engaging the sides of said elongated telephone body.

14. A telephone dialing adapter as defined by claim 13 wherein said elongated telephone body includes a hand-crank located on one side thereof, and wherein said means for selectively preventing the generation of ring-down signals comprises a cover secured to the opposite one of said pair of flange members, said cover extending along said one side of said elongated body to cover said hand-crank.

15. A telephone dialing adapter as defined by claim 14 wherein said cover is removably attached so as to extend in either direction along said one side of said elongated telephone body.

16. A telephone dialing adapter as defined by claim 15 wherein said cover is attached to said opposite one flange member by means of a hinge including a captured spring loaded hinge pin which is selectively removable for selectively positioning said cover in either direction along said one side of said elongated telephone body.

17. A telephone dialing adapter as defined by claim 16 wherein said opposite one flange member additionally includes a stop element for preventing the swinging of said cover outwardly from said one side of said elongated body but allowing said cover to be folded under said saddle member when detached from said telephone body.

18. A telephone dialing adapter as defined by claim 12 wherein said top panel of said telephone body includes headset-microphone connector means and wherein said adapter additionally includes dialing signal connector means located thereon engagable with said headset-microphone connector means.

* * * * *